(12) United States Patent
Gorshe

(10) Patent No.: US 6,529,599 B1
(45) Date of Patent: Mar. 4, 2003

(54) FLEXIBLE TRIBUTARY UNIT PROTECTION METHOD FOR A TRUNK-MULTIPLEXED METALLIC INTERFACE

(75) Inventor: Steven S. Gorshe, Beaverton, OR (US)

(73) Assignee: NEC America, Inc., Melville, NY (US)

( * ) Notice: Subject to any disclaimer, the term of this patent is extended or adjusted under 35 U.S.C. 154(b) by 0 days.

(21) Appl. No.: 09/111,417

(22) Filed: Jul. 7, 1998

(51) Int. Cl.⁷ .................................................. H04M 9/00
(52) U.S. Cl. .................................. 379/399.01; 379/412
(58) Field of Search ................................. 379/369, 399, 379/451, 283, 284; 370/359, 384, 216, 221, 225, 228, 226, 419, 420, 463; 335/174

(56) References Cited

U.S. PATENT DOCUMENTS

| 3,629,747 A | * 12/1971 | Findley ....................... 335/174 |
| 4,685,101 A | 8/1987 | Segal et al. .................... 370/84 |
| 5,146,384 A | 9/1992 | Markovic et al. ............. 361/55 |
| 5,311,551 A | 5/1994 | Eng ............................... 375/38 |
| 5,355,362 A | 10/1994 | Gorshe et al. .............. 370/16.1 |
| 5,495,470 A | 2/1996 | Tyburski et al. ............... 370/14 |
| 5,500,853 A | 3/1996 | Engdahl et al. ................ 370/17 |
| 5,592,475 A | * 1/1997 | Gliga et al. .................. 370/359 |

* cited by examiner

Primary Examiner—Forester W. Isen
Assistant Examiner—Jefferey Harold
(74) Attorney, Agent, or Firm—Campbell Stephenson Acolese LLP

(57) ABSTRACT

In a telephone system having multiple working metallic interface units, a method and a structure provide protection by assigning to each metallic interface unit a partner unit, which is another metallic interface unit. Under this arrangement, when a failure occurs in a working metallic interface unit, its partner unit switches the ring/tip input signals of the failed metallic interface unit to a protection bus. A standby or protective unit then takes over by receiving the rerouted tip/ring signals from the protection bus. The failed working unit can then be removed from the shelf without disrupting service.

24 Claims, 3 Drawing Sheets

FLEXIBLE TRIBUTARY UNIT PROTECTION METHOD FOR A TRUNK-MULTIPLEXED METALLIC INTERFACE

BACKGROUND OF THE INVENTION

1. Field of the Invention

The present invention relates to providing protection units to metallic interface units in a telephone system. In particular, the present invention relates to providing protection units without a dedicated protection switch and, at the same time, allowing metallic interface units of various service levels.

2. Discussion of the Related Art

In a digital telephone system, a "metallic" interface is an interface through which the copper wires of the subscriber equipment arrive at an entry point to the system. Conventionally, the metallic interface is characterized by a pair of "tip/ring" wires. The signals in the tip/ring wires may represent voice, data traffic or both. To maximize availability of the system, one or more stand-by interfaces ("protection units") are typically provided, so that, when a primary metallic interface ("working unit") fails, the tip/ring signals of the working unit can be re-routed to the protection unit without the subscriber suffering an undesirable disruption of service.

In the prior art, one of two types of methods for providing protection units is typically used. In the first method, a dedicated switching equipment ("protection switch") is used. The typical protection switch has an array of relays that are used for switching the signals from a failed working unit to an available protection unit. The protection switch approach provides satisfactory performance in multiplexed products for trunk (i.e. interoffice) operations, where the number of types of metallic interfaces are relatively small. The protection switch approach, however, becomes inadequate in systems where subscriber traffic of many different levels of service (e.g. DS1, DS2, voice frequency channel units) are multiplexed. Different levels of service have different protection requirements. For example, since a DS-2 interface has a much wider bandwidth than a DS-1 interface, the potential for a more significant data loss is higher in the DS-2 interface than the DS-1 interface, so that a higher protection requirement for the DS-2 interface is likely needed. In these systems, however, the protection switch approach dictates an expensive and complex switching control structure to ensure that the signals in a failed working unit is properly switched to a protection unit of the appropriate type.

The second type of methods for providing protection units involves a protection bus. Under this approach, a failed working unit routes, through its relays, the signals on the tip/ring wires to the protection bus. The control circuit then activates a protection unit to connect its input terminals to the protect bus to receive the re-routed tip/ring signals. This protection bus approach, while eliminating the complex protection switch, requires that the failed working unit remain capable of making a connection for routing the subscriber signals to the protection bus. In addition, the subscriber's service is necessarily interrupted when the failed unit is removed for repair or replacement.

SUMMARY OF THE INVENTION

According to the present invention, a system and a general method provide protection for metallic interfaces of different service levels. Under the present invention, a metallic interface unit is assigned a partner unit which switches the metallic interface unit's tip/ring input signals to a protection bus when a failure occurs in the metallic interface unit. A stand-by unit ("protection unit") then receives the re-routed tip/ring signals from the protection bus. Since the partner unit performs only a signal re-routing function, expensive protection switch units need not be provided. In addition, full protection can be provided because the failed working unit is not required to switch its own input tip/ring signals to the protection unit.

In one embodiment of the present invention, the metallic interface system includes (i) a protection bus; (ii) metallic interface units each having (a) input terminals for receiving a first set of tip/ring signals, (b) input terminals for receiving a second set of tip/ring signals, (c) a processing circuit providing a metallic interface for the first set of tip/ring signals, and (d) a switch circuit coupled to the first input terminals and the second input terminals for coupling the first set of tip/ring signals to the processing circuit and for coupling, upon receiving an asserted control signal, the second set of tip/ring signals to the bus; and (iii) a protection metallic interface unit coupled to receive from the protection bus a set of tip/ring signals. In this metallic interface system, the protection metallic interface unit implements a metallic interface for the set of tip/ring signals it receives from the protection bus.

In the above embodiment, the present invention assigns a partner unit to a selected metallic interface. This partner unit is typically another metallic interface unit. In that embodiment, the partner unit is coupled to receive the first set of tip/ring signals of the selected metallic interface unit at its second input terminals. According to the present invention, since the partner unit merely re-routes the selected metallic interface unit's tip/ring signals to the protection bus, the switch mechanism in each metallic interface unit can be the same, even though the partner unit and the selected metallic interface unit can be metallic interface units providing very different service levels. One significant advantage of the present invention is the possibility that metallic interface units of different types can coexist on the same shelf, sharing the same protection scheme. To simplify control, the selected metallic interface unit and the partner unit can be made to locate at adjacent slots on the same shelf.

According to another aspect of the present invention, the partner unit can include a control circuit providing a second control signal, which is used to disconnect the processing circuit of the failed metallic interface unit from its input ring/tip signals.

According to another aspect of the present invention, if the number of working units is odd, a selected metallic interface unit is assigned a protection unit as its partner. In one embodiment, protection relays in the selected metallic interface unit is used to couple a set of tip/ring signals from the protection bus to the protection unit. Under the present invention, the number of protection relays required grows linearly with the number of metallic interface units.

According to another aspect of the present invention the protection bus of a shelf can be segmented to allow the different segments of the protection bus to provide protection to metallic interface units of different service levels, or to provide a lower protection ratio for high speed applications.

The present invention is better understood upon consideration of the detailed description below and the accompanying drawings.

DETAILED DESCRIPTION OF THE PREFERRED EMBODIMENT

Figure 1:
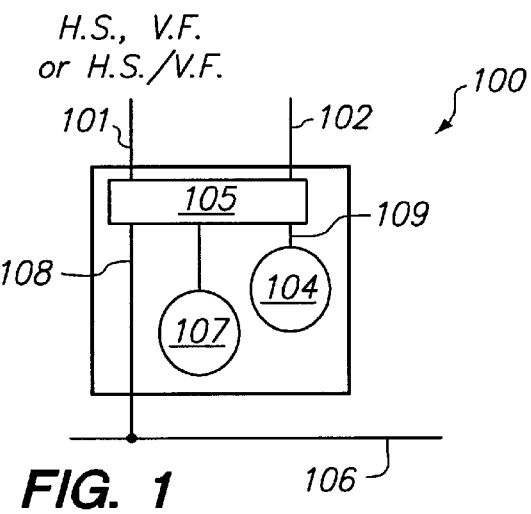
FIG. 1 illustrates generally, in one embodiment of the present invention, a metallic interface unit 100.

The present invention provides protection for metallic interfaces to subscriber equipment of various bandwidths. In this description, to prevent repetition and to simplify discussion, like elements in the figures are provided like reference numerals.

This detailed description provides, as an example, an embodiment of the present invention in metallic interfaces to a fiber optics transmission system under the synchronous optical network (SONET) standard. In this embodiment, the metallic interface units are mounted on one or more conventional equipment shelves and communicate over one or more backplane busses. Each of these metallic interface units can be any interface unit which receives the traffic carried in the tip/ring wires and retransmits the signals received in assigned time slots. In one implementation, each shelf includes 24 slots for accommodating up to 24 single-slot interface units or up to 12 double-slot interface units. The interface units communicate with each other over control and data busses provided in the backplane.

In the present embodiment, as illustrated in FIG. 1, each interface unit 100 can have one of three types of input terminals for coupling the tip/ring wires: high speed (HS) input terminals, voice frequency (VF) input terminals, and shared HS/VF input terminals. In FIG. 1, the input terminals of unit 100 are labeled 101. Typically, the HS input terminals receive wideband signals such as DS-1. The VF input terminals receive narrow band traffic, including conventional "POTS"—plain old telephone service. Depending upon the application, the shared HS/VF input terminals receive either HS or VF input signals. If the metallic interfaces are provided in a system at a central office terminal (COT), the shared HS/VF terminals are likely to receive HS tip/ring signals. Alternatively, if the metallic interfaces are provided in a system at a remote terminal (RT), the shared HS/VF terminals are likely to receive VF tip/ring signals. In that implementation, to allow maximum flexibility, no restriction is imposed upon the placement of interface units with different bandwidths. Thus, a narrowband interface unit can be placed next to a wideband interface unit. As illustrated generally in FIG. 1, interface unit 100 includes (i) partner input terminals 102 for coupling a set of tip/ring signals to a protection bus 106, (ii) processing circuit 104 for receiving and processing the tip/ring signals received at input terminals 101, (iii) a switch mechanism 105, including relay switches, for switching the tip/ring signals received at the partner terminals 102 to either protection bus 106 (via pathway 108) and/or terminals 101 to processing circuit 104 (via pathway 109), and (iv) a control circuit 107 for controlling switch mechanism 105. It is understood in this description that a direct connection can be part of switch mechanism 105. Although shown in FIG. 1 as a single bus, depending upon actual system requirements, protection bus 106 may be implemented as a single shared bus for both HS and VF applications, or separate HS and VF busses.

According to the present invention, each interface unit acts as a "partner" unit for another interface unit. In addition to receiving the input signals at its input terminals 101 and processed in its processing circuit (e.g., processing circuit 104 of FIG. 1), the partner unit also receives at its partner input terminals 102 the input signals of another interface unit. Each interface unit need not be assigned as the partner unit for the interface unit in an adjacent slot, although such arrangement can simplify control. According to the present invention, at least four protection schemes are possible in each shelf of the subscriber access system: (a) 1:1 protection of critically high speed interface units; (b) 1:n full protection for wideband interface units, (c) 1:n partial protection for narrowband or wideband interface units and (d) no protection for channel units. All of these protection schemes may be present simultaneously on a single shelf, as will be apparent to those skilled in the art upon consideration of the following description.

Figure 2:
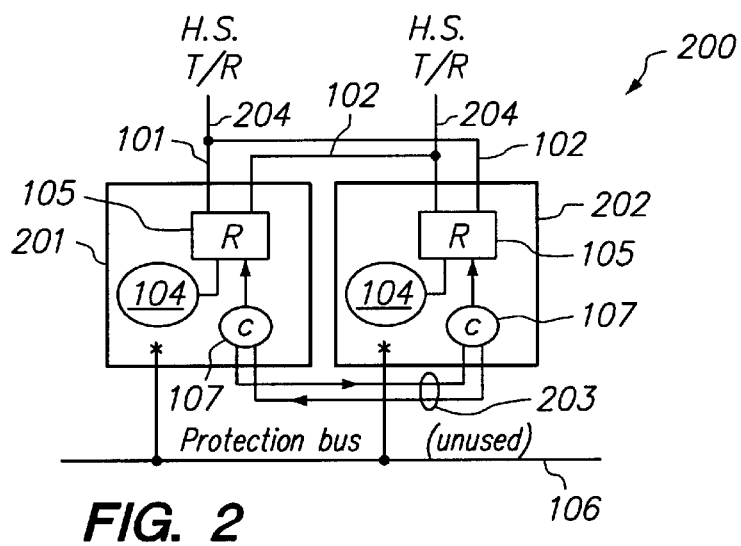
FIG. 2 shows, in the embodiment of FIG. 1, a configuration 200 including working unit 201 and protection unit 202, providing 1:1 protection for a critical high speed application.

FIG. 2 shows, in the embodiment of FIG. 1, a configuration 200 including working unit 201 and protection unit 202, providing 1:1 protection for a critical high speed application (e.g., DS-3) or high priority interfaces. As shown in FIG. 2, HS tip/ring signals 204 are provided to HS terminals 101 of working unit 201 and the partner terminals 102 of partner protection unit 202. Likewise, a HS tip/ring signals 204 are provided to HS terminals 101 of protection unit 202 and partner terminals 102 of protection unit 202. Control circuits 107 of working unit 201 and protection unit 202 communicate over a control bus 203. In configuration 200, relay switches are provided in switch mechanism 105 to connect the partner input terminals 102 to processing circuit 104. Relay switches for coupling partner input terminals 102 to protection bus 106 need not be provided.

If working unit 201 fails, protection unit 202 is activated to take over from working unit 201. In this embodiment, an interface unit fails when (i) a failure condition is diagnosed by a built-in diagnostic circuit or program, (ii) the interface unit is physically or logically removed from the subscriber access system, and (iii) a system controller unit (not shown) detects a failure condition in the interface unit. By overriding local control at working unit 201 and controlling working unit 201's switch mechanism 105 through working unit 201's control circuit 107, protection unit 202 disconnects tip/ring signals 204 from working unit 201's HS terminals 101. Simultaneously, protection unit 202 connects its processing circuit 104 to tip/ring signals 204 at protection unit 202's partner input terminals 102. Working unit 201 can then be removed from the shelf for repair or replacement without interrupting service. Control bus 203 is implemented by an open-collector with pull-up output structure, so that removal of working unit 201 does not affect protection unit 202's switch mechanism 105. To prevent a failing working unit from erroneously disconnecting its partner protection unit, built-in redundancy can be provided to enhance robustness of control circuit 107

Figure 3A:
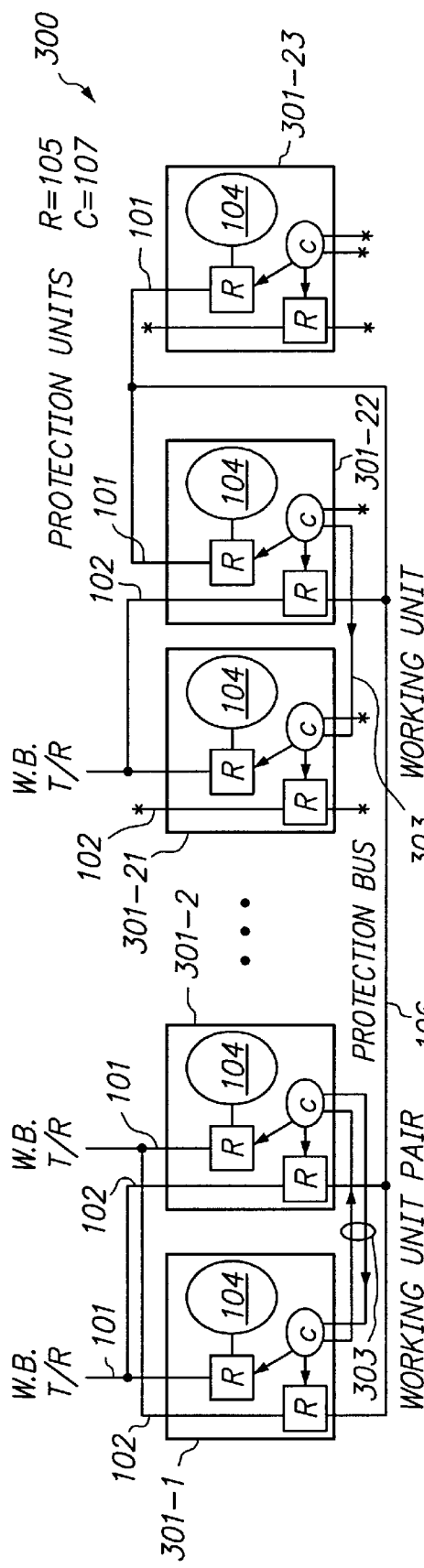
FIG. 3a shows an embodiment of the present invention in a configuration 300, which provides a 1:n full protection scheme for wideband interface units.
Figure 3B:
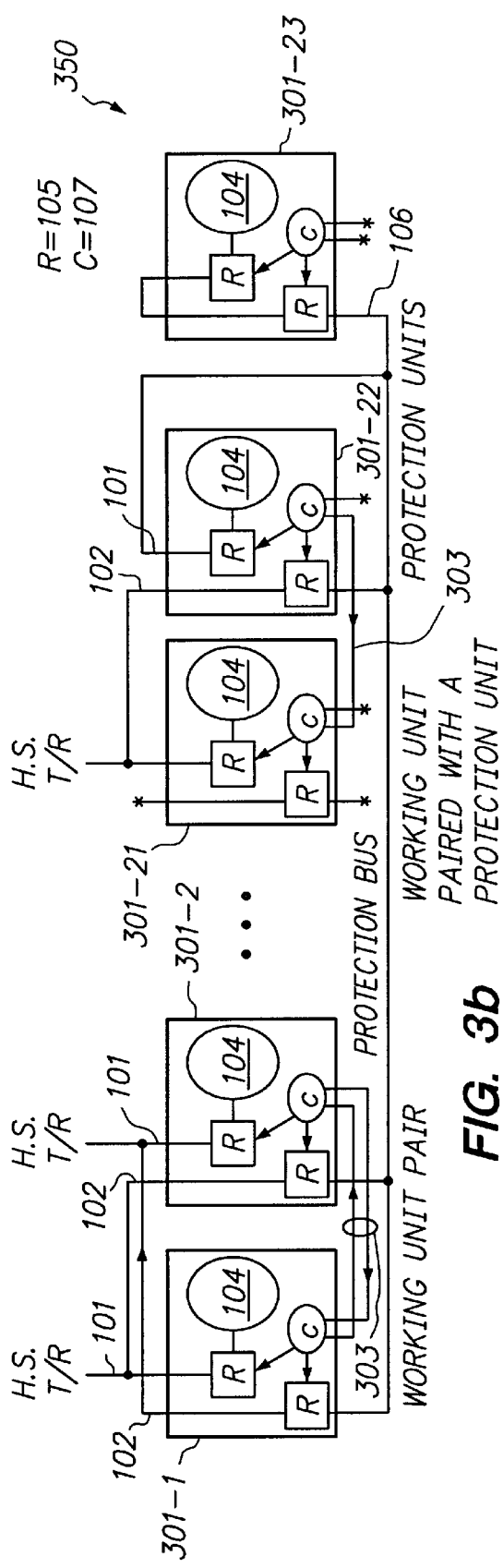
FIG. 3b shows an embodiment of the present invention in a configuration 350, which also provides a 1:n full-protection scheme for wideband interface units.

FIG. 3a and 3b show an embodiment of the present invention in a configurations 300 and 350, respectively, each providing a 1:n full protection scheme for wideband interface units. For example, configuration 300 includes working units 301-1 to 301-21 and protection units 301-22 to 301-24. Protection unit 301-24, which is not shown, is connected to protection bus 106 in the same manner as protection unit 301-23 shown in FIG. 3a. As shown in FIG. 3a, each of working units 301-1 to 301-20 acts as a partner interface unit to another working unit, except for working unit 301-21, which partners with protection unit 301-22. In configuration 300, HS tip/ring signals are provided at HS terminals 101 of each of working units 301-1 to 301-20 and at partner input terminals 102 of the corresponding partner unit. Because there is an odd number of working units, working unit 301-21 is assigned protection unit 301-22 as a partner unit. Working unit 301-21 is not coupled directly to protection bus 106. Protection unit 301-22, which is the partner interface unit for working unit 301-21, receives at its partner input terminals 102 the HS tip/ring signal also received by working unit 301-21. When any one of working units 301-1 to 301-21 fails, the failed working unit's partner unit disconnects the input terminals 101 of the failed working unit through control signals on bus 303, and reroutes the HS tip/ring signals of the failed working unit through the protection relays of the partner unit's switch mechanism 105 to protection bus 106. When activated under the presently discussed protection scheme, any of the protection units 301-22 to 301-24 receives at its input terminal 101 the HS tip/ring signals of the failed working unit routed via protection bus 106. Alternatively, as shown in configuration 350 of FIG. 3b, the protection relays of protection unit 301-23 and 301-24 can each route the tip/ring signals from protection bus 106 to input terminals 101. One of the protection units 301-22 to 301-24 is then activated to receive the routed tip/ring signals from protection bus 106. Note that, since the partner unit in this instance only reroutes tip/ring signals from the partner unit's input terminals to a protection bus, any interface unit can be a partner interface unit of another interface unit regardless of type or service level. Thus, for example, an DS-1 interface unit can be assigned a partner interface unit to an ADSL interface unit. Although FIG. 3 illustrates a 1:21 protection, if protection bus 106 is segmented into three segments, 1:7 protection can be implemented, which may be preferable for certain high speed applications.

Figure 4:
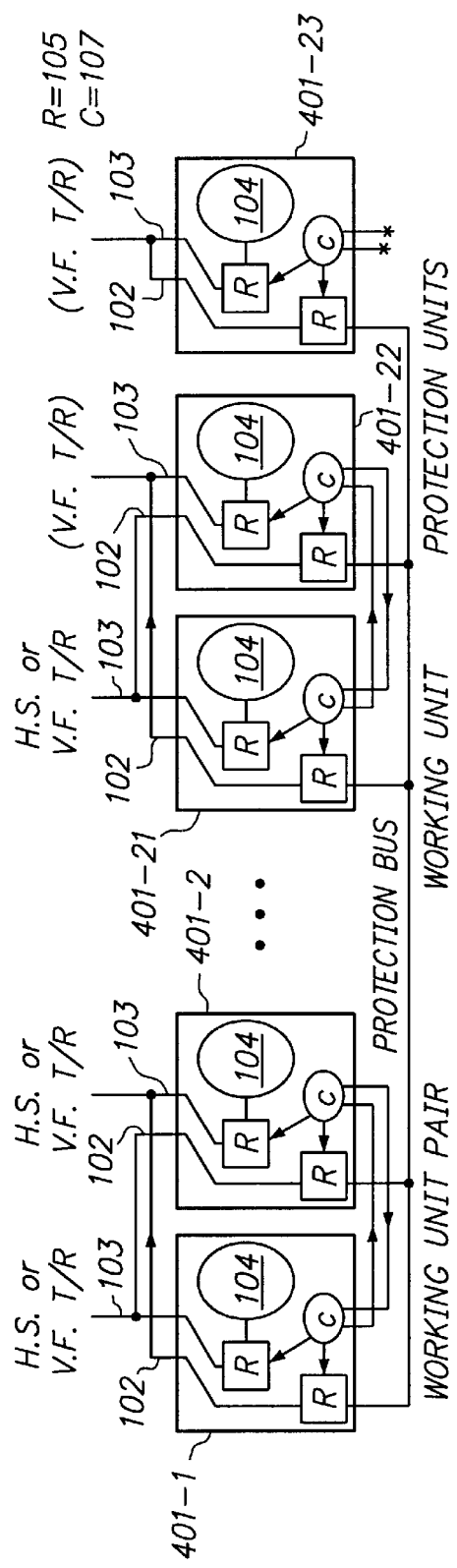
FIG. 4 shows an embodiment of the present invention in a configuration 400, which providing a 1:n full protection scheme for interface units which can be either wideband or narrowband.

FIG. 4 shows an embodiment of the present invention in a configuration 400, which providing a 1:n full protection scheme for interface units which can be either wideband or narrowband. Configuration 400 includes working units 401-1 to 401-21 and protection units 401-22 to 401-24. Protection unit 401-24, which is not shown, is connected to protection bus 106 in the same manner as protection unit 401-23 shown in FIG. 4. As shown in FIG. 4, each of working units 401-1 to 401-20 acts as a partner interface unit to another working unit, except for working unit 401-21, which partners with protection unit 401-22. In configuration 400, HS or VF tip/ring signals are provided simultaneously at shared HS/VF terminals 103 of each of working units 401-1 to 401-20 and at partner input terminals 102 of the corresponding partner interface unit. Because there are an odd number of working units, working unit 401-21 is assigned protection unit 401-22 as a partner unit. Because VF tip/ring signals of the present embodiment can be exposed to lightning, which can cause voltage surges as much as 2500 volts into the system, VF tip/ring signals are coupled to protection bus 106 only through protection relays in switch mechanism 105. In addition, protection units 401-22 to 401-24 receive their tip/ring signals from protection bus 106 also through protection relays of their respective switch mechanism 105. Thus, protection unit 401-22, which is the partner interface unit for working unit 401-21, receives at its partner input terminals 102 the VF tip/ring signals of working unit 401-21, and receives input tip/ring signals from protection bus 106 at its input terminals 101 through protection relays in working unit 401-21's switch mechanism 105. Protection units 401-23 and 401-24 each receive its input tip/ring signals at its input terminals 101 through protection relays in the protection unit's switch mechanism 105. When activated under the presently discussed protective scheme, each partner unit of a failed working unit disconnects, through signals on control bus 403, the input terminals 101 of the failed working unit, and routes the input tip/ring signals of the failed working unit to protection bus 106 via the protection relays. One of the protection units 401-22 to 401-24 is then activated to receive the routed tip/ring signals from protection bus 106, either through protection relays in its own switch mechanism 105 or, in the case of protection unit 401-22, through protection relays in working unit 401-21. Since protection unit 401-22 relies on the protection relays of working unit 401-21, protection unit 401-22 cannot be the protection unit for working unit 401-21 (otherwise, the failed working unit 401-21 cannot be removed or replaced while protection unit 401-22 processes working unit 401-21's traffic). When working unit 401-21 fails, one of protection units 401-23 and 401-24 must be selected.

Figure 6:
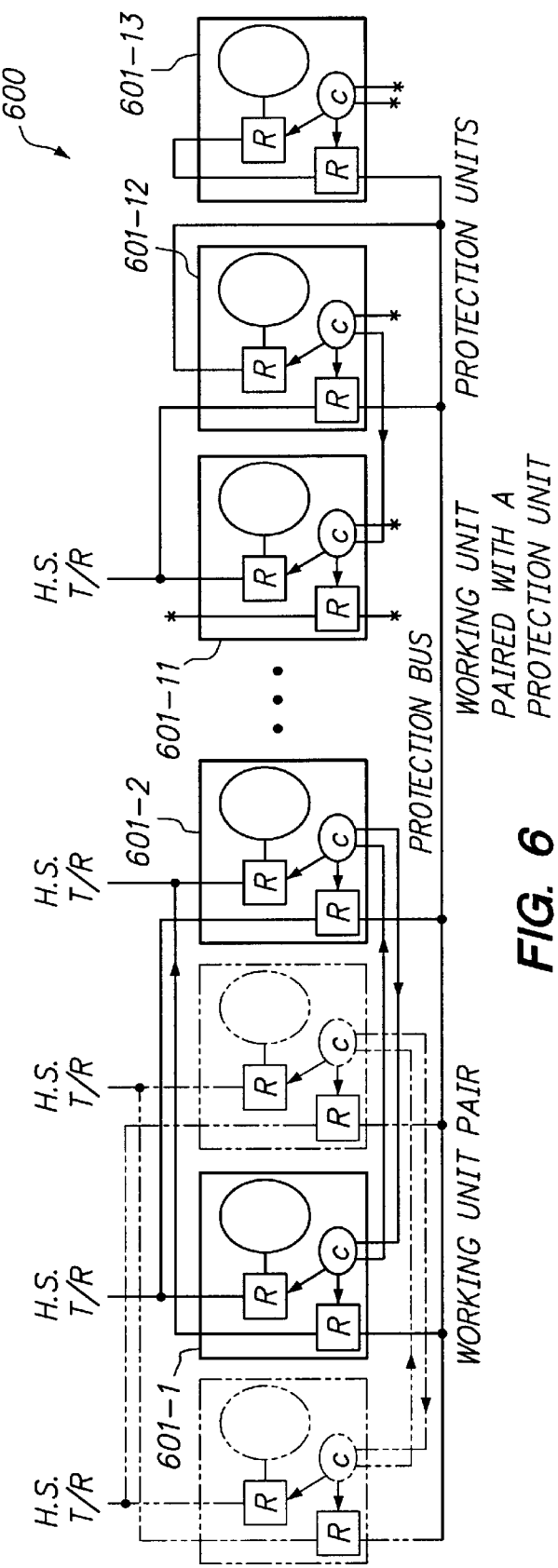
FIG. 6 is an example of a configuration 600 which accommodates double-slot interface units.

In this embodiment, some interface units can occupy two slots on the shelf. One example of applying the protection scheme of the present invention is illustrated by configuration 600 of FIG. 6. FIG. 6 is similar to configuration 350 of FIG. 3b above, except that working units 601-1 to 601-10 are double-slot units organized as ten working unit pairs, and working unit 601-11 is a single-slot unit partnered with protection unit 601-12. The remainder of the 24-slot shelf can be populated by a double-slot protection unit or two single-slot protection units.

Figure 5:
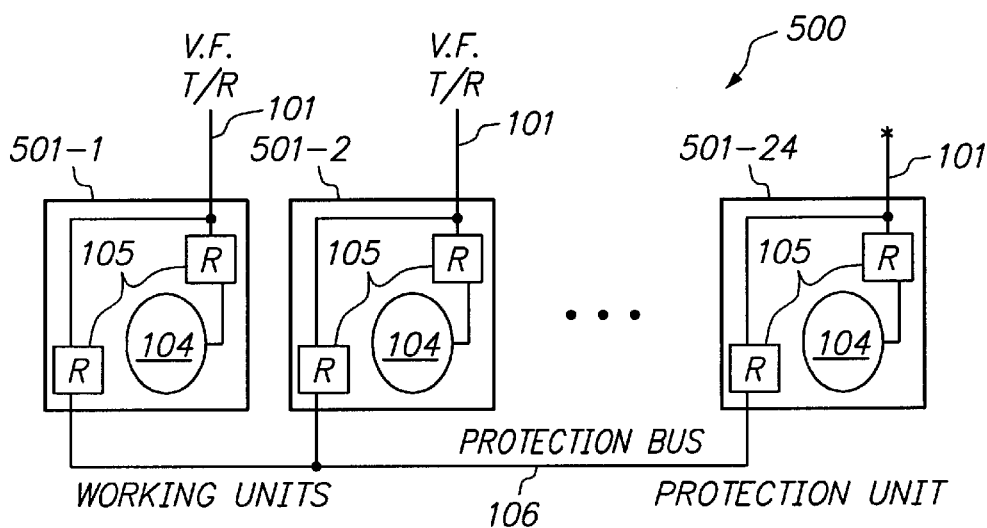
FIG. 5 shows a configuration 500 which provides 1:n partial protection.

1:n partial protection can be preferable for narrowband or non-critical wideband application. FIG. 5 shows a configuration 500 providing 1:n partial protection. In configuration 500, 23 working units 501-1 to 501-23 are protected by a protection unit 501-24, to provide a 1:23 partial protection. Unlike configurations 300 and 400 above, none of working units 501-1 to 501-23 is assigned a partner unit. Thus, in each of working units 501-1 to 501-23, tip/ring signals are provided at input terminals 101 and the partner input terminals 102 remain unconnected. Within each of working units 501-1 to 501-23, the input tip/ring signals are routed both to processing circuit 104 and, to protection relays in switch mechanism 105, which routes the tip/ring signals to protection bus 106 during a failure. When a failure is detected in a working unit, the protection relays of the working unit couples the input tip/ring signals to protection bus 106. Protection unit 501-24 is then activated to receive through its protection relays the routed tip/ring signals on protection bus 106. Because partner units are not assigned, unlike configurations 300 and 400 described above, the protection scheme of configuration 500 is only partial because the failed working unit may fail in such a way that the input tip/ring signals cannot be properly coupled to protection bus 106, and hence unable to allow protection unit 501-24 perform its protection function.

In the present embodiment, if no protection is desired, all slots on the shelf can be used for working units. For example, configuration 500 can be easily converted into a no-protection configuration by connecting protection unit 501-24 to a set of external tip/ring wires. In that instance, protection bus 106 need not be disconnected from working units 501-1 to 501-24, since protection bus 106 is relatively short.

The present invention can be implemented in a system in which multiple priority levels can be established for the protection bus. In such a system, when a failed working unit requests use of the protection bus—and hence a protection unit—if the protection bus is already granted to another failed working unit having a higher priority, the current request for the protection bus is queued until the higher priority working unit is back on-line. If the current request for the protection bus is of a higher priority than an existing failed unit currently granted the protection bus, the current request can preempt that existing failed working unit. Priority can be determined according the following factors: (a) the number of channels affected by the failure, (b) the number of circuits affected by the failure, and (c) a user-specified priority level.

The above detailed description is provided to illustrate the specific embodiments of the present invention and is not intended to limit the scope of the present invention. Numerous variations and modification within the scope of the present invention are possible. The present invention is defined only by the following claims.

I claim:

1. A telephone or data communication system with metallic interfaces, comprising:
   a bus;
   one or more metallic interface units each having (a) first input terminals for receiving a first set of tip/ring signals, (b) second input terminals for receiving a second set of tip/ring signals, (c) a processing circuit providing a metallic interface for said first set of tip/ring signals, (d) a switch circuit coupled to said first input and second input terminals for coupling said first set of tip/ring signals to said processing circuit and for coupling, upon receiving an asserted control signal, said second set of tip/ring signals to said bus; and
   a protection metallic interface unit coupled to receive from said bus a set of tip/ring signals, said protection metallic interface unit implementing a metallic interface for said set of tip/ring signals from said bus;
   wherein said metallic interface units support various classes of services, each metallic interface unit being adapted to support one of said classes of services, said telephone system further comprising additional protection units each one of which is capable of supporting two or more of said classes of services.

2. A telephone or data communication system as in claim 1, wherein a selected one of said metallic interface units is assigned another one of the metallic interface units as a partner unit, said partner unit being coupled to receive said first set of tip/ring signals of said selected metallic interface unit at its second input terminals.

3. A telephone or data communication system as in claim 2, wherein said partner unit and said selected metallic interface unit occupy non-adjacent slots in an equipment shelf.

4. A telephone or data communication system as in claim 2, wherein said partner unit and said selected metallic interface unit provide different service levels.

5. A telephone system or data communication as in claim 2, wherein said selected metallic interface unit and said partner unit are located at adjacent slots on the same shelf.

6. A telephone or data communication system as in claim 2, wherein said partner unit includes a control circuit providing a second control signal, and wherein said switch circuit of said selected metallic interface unit, upon receiving said second control signal in an asserted state, disconnects said processing circuit from said first set of ring/tip signals.

7. A telephone or data communication system as in claim 2, wherein said protection unit receives said set of tip/ring signals from said bus via protection relays in said protection unit.

8. A telephone or data communication system as in claim 2, wherein said protection metallic interface unit serves as a partner unit for one of said metallic interface units.

9. A telephone or data communication system as in claim 1, wherein a selected one of said plurality of metallic interface unit includes output terminals, said switch circuit of said selected metallic interface unit coupling a set of tip/ring signals from said bus to said output terminals, said protection metallic interface unit receiving from said output terminals said tip/ring signals for which it provides said metallic interface.

10. A telephone or data communication system as in claim 1, wherein said switch circuit includes protection relays.

11. A telephone or data communication system as in claim 1, wherein said metallic interface units include first and second metallic interface units of first and second service levels, respectively, and wherein said bus includes first and second segments corresponding to said first and second service levels, respectively.

12. A method for providing protection in a telephone or data communication system, comprising the steps of:
   providing a bus;
   providing one or more metallic interface units each having (a) first input terminals for receiving a first set of tip/ring signals, (b) second input terminals for receiving a second set of tip/ring signals, (c) a processing circuit providing a metallic interface for said first set of tip/ring signals, (d) a switch circuit coupled to said first input and second input terminals for coupling said first set of tip/ring signals to said processing circuit and for coupling, upon receiving an asserted control signal, said second set of tip/ring signals to said bus; and
   providing a protection metallic interface unit coupled to receive from said bus a set of tip/ring signals, said protection metallic interface unit implementing a metallic interface for said set of tip/ring signals from said bus;
   wherein said metallic interface units support various classes of services, each metallic interface unit being adapted to support one of said classes of services, said method further comprising the step of providing additional protection units each one of which is capable of supporting two or more of said classes of services.

13. A method as in claim 12, wherein a selected one of said metallic interface units is assigned another one of said metallic interface units as a partner unit, said partner unit being coupled to receive said first set of tip/ring signals of said selected metallic interface unit at its second input terminals.

14. A method as in claim 13, wherein said partner unit and said selected metallic interface unit occupy non-adjacent slots in an equipment shelf.

15. A method as in claim 13, wherein said partner unit and said selected metallic interface unit provide different service levels.

16. A method as in claim 13, wherein said selected metallic interface unit and said partner unit are located at adjacent slots on an equipment shelf.

17. A method as in claim 13, wherein said partner unit includes a control circuit providing a second control signal, and wherein said switch circuit of said selected metallic interface unit, upon receiving said second control signal in an asserted state, disconnects said processing circuit from said first set of ring/tip signals.

18. A method as in claim 13, wherein said protection unit receives said set of tip/ring signals from said bus via protection relays in said protection unit.

19. A method as in claim 13, wherein said protection metallic interface unit is also provided as a partner unit for one of said metallic interface units.

20. A method as in claim 12, wherein a selected one of said plurality of metallic interface unit includes output terminals, said switch circuit of said selected metallic interface unit coupling a set of tip/ring signals from said bus to said output terminals, said protection metallic interface unit receiving from said output terminals said tip/ring signals for which it provides said metallic interface.

21. A method as in claim 12, wherein said switch circuit are provided protection relays.

22. A method as in claim 12, wherein said metallic interface units include metallic interface units of first and second service levels, respectively, and wherein said bus includes first and second segments corresponding to said first and second service levels, respectively.

23. A telephone or data communication system with metallic interfaces, comprising:

a bus;

one or more metallic interface units each having (a) first input terminals for receiving a first set of tip/ring signals, (b) second input terminals for receiving a second set of tip/ring signals, (c) a processing circuit providing a metallic interface for said first set of tip/ring signals, (d) a switch circuit coupled to said first input and second input terminals for coupling said first set of tip/ring signals to said processing circuit and for coupling, upon receiving an asserted control signal, said second set of tip/ring signals to said bus; and a protection metallic interface unit coupled to receive from said bus a set of tip/ring signals, said protection metallic interface unit implementing a metallic interface for said set of tip/ring signals from said bus;

wherein a selected one of said metallic interface units is assigned another one of the metallic interface units as a partner unit, said partner unit being coupled to receive said first set of tip/ring signals of said selected metallic interface unit at its second input terminals, wherein said partner unit and said selected metallic interface unit provide different service levels.

24. A method for providing protection in a telephone or data communication system, comprising the steps of:

providing a bus;

providing one or more metallic interface units each having (a) first input terminals for receiving a first set of tip/ring signals, (b) second input terminals for receiving a second set of tip/ring signals, (c) a processing circuit providing a metallic interface for said first set of tip/ring signals, (d) a switch circuit coupled to said first input and second input terminals for coupling said first set of tip/ring signals to said processing circuit and for coupling, upon receiving an asserted control signal, said second set of tip/ring signals to said bus; and providing a protection metallic interface unit coupled to receive from said bus a set of tip/ring signals, said protection metallic interface unit implementing a metallic interface for said set of tip/ring signals from said bus;

wherein a selected one of said metallic interface units is assigned another one of said metallic interface units as a partner unit, said partner unit being coupled to receive said first set of tip/ring signals of said selected metallic interface unit at its second input terminals, wherein said partner unit and said selected metallic interface unit provide different service levels.

\* \* \* \* \*